US008579689B2

(12) United States Patent
Gauselmann

(10) Patent No.: US 8,579,689 B2
(45) Date of Patent: Nov. 12, 2013

(54) AWARDING OF GAME FEATURES IN A GAMING MACHINE

(75) Inventor: Michael Gauselmann, Espelkamp (DE)

(73) Assignee: Spielo International Canada ULC, Moncton, New Brunswick (CA)

(*) Notice: Subject to any disclaimer, the term of this patent is extended or adjusted under 35 U.S.C. 154(b) by 3953 days.

(21) Appl. No.: 10/655,950

(22) Filed: Sep. 4, 2003

(65) Prior Publication Data

US 2005/0054412 A1 Mar. 10, 2005

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/16; 463/20; 463/21; 463/22; 463/23; 463/25; 463/43; 463/46; 273/138.1; 273/138.2; 273/141 R; 273/142 R; 273/143 R

(58) Field of Classification Search

USPC ........... 463/16, 20–23, 25, 43, 46; 273/138.1, 273/141 R, 143 R, 142 R, 138.2

See application file for complete search history.

(56) References Cited

U.S. PATENT DOCUMENTS

| | | | | |
|---|---|---|---|---|
| 5,823,874 | A * | 10/1998 | Adams | 463/17 |
| 5,997,401 | A * | 12/1999 | Crawford | 463/20 |
| 6,089,977 | A * | 7/2000 | Bennett | 463/20 |
| 6,142,873 | A * | 11/2000 | Weiss et al. | 463/20 |
| 6,190,254 | B1 * | 2/2001 | Bennett | 463/13 |
| 6,270,412 | B1 * | 8/2001 | Crawford et al. | 463/20 |
| 6,638,164 | B2 * | 10/2003 | Randall et al. | 463/20 |
| 6,905,407 | B2 * | 6/2005 | Nordman | 463/20 |
| 7,399,226 | B2 * | 7/2008 | Mishra | 463/18 |
| 7,431,649 | B2 * | 10/2008 | Webb et al. | 463/25 |
| 2004/0014521 | A1 * | 1/2004 | Seelig et al. | 463/20 |

* cited by examiner

*Primary Examiner* — Damon Pierce
*Assistant Examiner* — Wei Li
(74) *Attorney, Agent, or Firm* — Patent Law Group LLP; Brian D Ogonowsky

(57) ABSTRACT

A game played on a gaming machine, or any other suitable device, is described wherein a player plays a base game, such as the random selection and display of symbols where combinations of symbols across one or more paylines grant awards to a player. Upon a triggering event, such as a certain outcome in the base game, special features are randomly selected for application to the base game. The special features may include wild cards, multipliers, and the number of game to which the special features apply. Any combination of special features may be randomly selected in response to a triggering event. Many other features are described.

30 Claims, 2 Drawing Sheets

AWARDING OF GAME FEATURES IN A GAMING MACHINE

FIELD OF THE INVENTION

This invention relates to gaming machines and, in particular, to awarding a player special features to be applied to a game played on a gaming machine.

BACKGROUND

A typical gaining machine found in casinos carries out a single game having unchanging features, such as displaying rotating reels having symbols, where the resulting symbol combinations correspond to awards to be paid to the player.

What is needed is a gaming machine that offers the player additional excitement and an incentive to play longer.

SUMMARY

A game played on a gaming machine, or any other suitable device, is described wherein a player plays a base game, such as the random selection and display of symbols, where combinations of symbols across one or more paylines grant awards to a player. Upon certain outcomes in the base game, or upon other triggering events, special features are applied to the base game.

In one example, upon a special symbol combination being displayed in the base game, the gaming machine automatically selects a number of special games (also referred to as power games) that the player may now play. These power games may be free games or may require the player to bet credits to play. The power games have special features applied to them. In one embodiment, any award granted in a power game is multiplied by a multiplier randomly selected for the power games. Another of the special features may be a wild card feature where a wild card symbol is selected and applied to the power games. The number of power games to which the special features apply may be selected at random by the machine's processor.

Many other types of special features in any combination may also be applied to the power games.

In another embodiment, as the player plays the base game, certain symbols (referred to as shots) are "accumulated" by the player as they are displayed during the base game. When the player accumulates a predetermined number of these shots, the gaming machine enables the power game feature, whereby the number of power games and the special features are randomly selected.

In another embodiment, the accumulated shots provide the player additional opportunities to select a multiplier or a wild card, or any other special feature. For example, if the player has accumulated five shots and the power games feature has been triggered, the player may use each of those shots to cause the gaming machine to randomly select a new multiplier if the player is not satisfied with the multiplier that the gaming machine has selected. This reselection may be applied to any features in the power games.

Other embodiments are described where special features are applied to a base game as an award to the player. The invention provides additional excitement in the game and gives the player added incentive to keep playing the game.

DETAILED DESCRIPTION

Although the invention can typically be implemented by installing a software program in most types of modern video gaming machines, one particular gaming machine platform having a "top box" for displaying the inventive features (referred to as "power games") will be described in detail.

Figure 1:
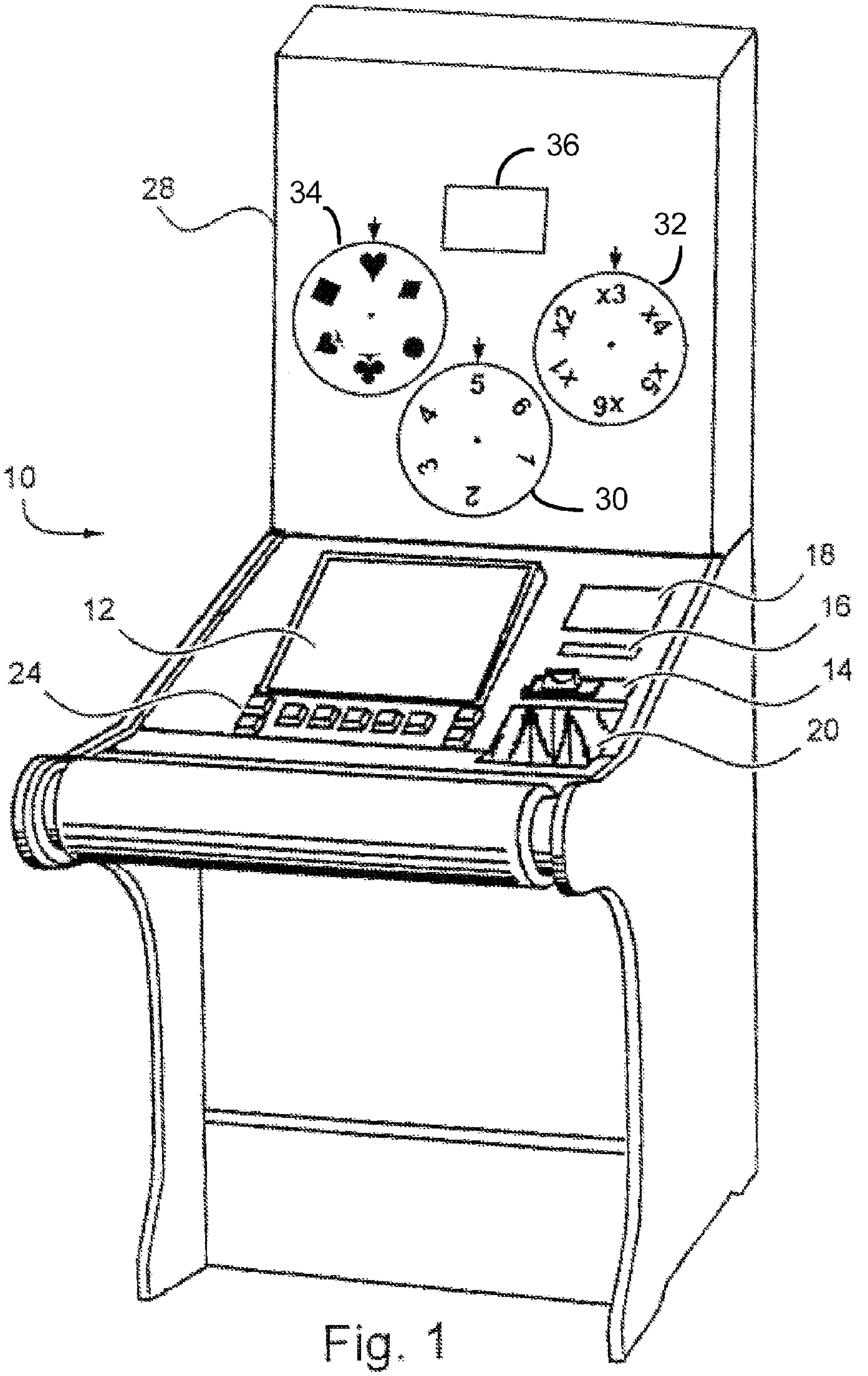
FIG. 1 is a perspective view of one type of gaming machine that incorporates the present invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. Display 12 may include a touch screen for converting a player's touching of areas of the screen into commands for the game program to carry out. Display 12 may also be a window revealing motor-driven rotating reels.

A coin slot 14 accepts coins or tokens in one or more denominations to generate credits within machine 10 for playing games. An input slot 16 is also provided for receiving bills, machine readable printed tickets, cashless gaming cards, smart cards, or other types of media for generating credits within machine 10. A display 18 may identify instructions to the player for depositing money or monetary equivalents into machine 10.

A coin tray 20 is provided for receiving coins or tokens from a hopper upon a win or upon the player cashing out.

Player control buttons 24 include any buttons needed for the play of the particular game or games offered by machine 10 including, for example, a bet button, a repeat bet button, a play two-ways button, a spin reels button, a maximum bet button, a cash-out button, a pay table button, and any other suitable buttons for the base game offered by machine 10. Buttons 24 may be replaced by a touch screen with virtual buttons.

Figure 2:
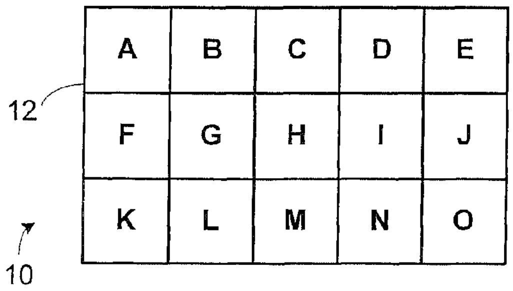
FIG. 2 is an illustration of one example of the base game where combinations of symbols are randomly chosen.

A typical base game will be the random selection of an array of symbols displayed on the video display 12, where the symbols are determined by a pseudo random number generator. FIG. 2 illustrates a 5×3 array of symbols (shown as letters A-O) that may be displayed on video display 12 for the base game. Combinations of symbols across any activated payline grant awards to the player and/or activate the power games special feature. The symbols may also be in a 1×3 array, a 3×3, array, a 4×4 array, or any other format. The presentation may emulate the rotation of reels. A conventional CPU in machine 10 controls a display controller to stop the simulated rotation of the reels to display the symbol combination previously selected by the random number generator.

As would be advertised on display 12 or on a display glass, such as in the top box portion 28, one or more special combinations of symbols, or other triggering event, activate the power games feature. In one embodiment, the power games feature is initiated when the base game generates three or more of the same symbols across a payline. A certain signal is generated when such a special outcome occurs in the base game to activate the power games. Such a signal may be a particular code generated by a pay table ROM or the CPU that results when the special symbol combination is present. The hardware and software used to identify the outcome of a base game and initiate a special software routine are well known and conventional and need not be described in detail. In addition to the power games feature being triggered, the player may also obtain an instant win for the special symbol combination.

In the example of FIG. 1, the power games feature consists of three selectors: a power games selector 30 that selects the number of power games, a multiplier selector 32 that selects a multiplier for any award generated in the power games, and a wild card symbol selector 34 that selects a symbol that acts as a wild card when displayed in the base game to represent all symbols. Selectors 30, 32, and 34 may be motor-driven wheels, illuminated backlights, a video display, or any other type of display. If the selectors are video images, they may be displayed on the same screen as the base game or on a different screen. A separate display area 36 may display any suitable information such as the awards granted.

Upon the special symbol combination being generated in the base game, selector 30 spins and randomly stops to indicate the number of power games that will be played. In this case, the power game selector 30 selected five power games. The number of power games selected by selector 30 identifies the number of games for which the special features will apply. The power games may be free games or may be games that require the player to bet credits. The special features that apply to the power games may include any features. In the example of FIG. 1, the special features include a multiplier, selected by selector 32, and a wild card, selected by selector 34.

Concurrently with the spinning of selector 30 or after the spinning of selector 30, the selector 32 selects a multiplier for any award that is conventionally granted in the base game during a power game. In the example of FIG. 1, the selected multiplier is ×3. This multiplier may apply for all five power games or may be selected each time a new power game is played.

The selector 34 for the wild card also spins to identify a symbol that will act as a wild card during the power games. In the example of FIG. 1, the symbol is a heart symbol. The five power games are then played on the base game with the multiplier and wild card, or the multiplier and wild card may be selected for each power game. In one embodiment, the wild card symbol remains active until the base game displays the wild card symbol. The awarded credits during the power games may be displayed in area 36. The selectors 30, 32, and 34 may be controlled by a random number generator.

Additional features may also be combined with the features described above. In one embodiment, whenever a special symbol is displayed in the base game (such as the symbol H from FIG. 2), a meter is incremented so that the special symbols get accumulated during play. The accumulated symbols may be displayed in area 36. The accumulation of a predetermined number of these symbols (such as 10) gives the player additional features. This keeps the player playing the gaming machine so as not to lose the accumulated symbols. For example, upon the accumulation of the predetermined number of symbols, the power games feature is initiated. The selectors 30, 32, and 34 may then spin to provide the player a certain number of power games with the special features.

Each accumulated symbol may also allow the player to respin any of the selectors 30, 32, or 34 after the power games feature is initiated if the player is not satisfied with the original selection. Such a respin may apply to only the multiplier or the wild card selector. A respin may also cause all the selectors to spin.

For certain outcomes in the base game, such as three special symbols, the power games feature may not be initiated, but one or both of the other selectors 32 and 34 may spin to apply the multiplier or wild card to one of more games as a reward for the certain outcome of the base game. In one embodiment, the selected wild card is applied to each subsequent base game until the wild card is used in the base game. The feature is then extinguished.

With a combination of four symbols across a payline generated in the base game, both the wild card selector 34 and multiplier selector 32 are activated. If the player has accumulated any special symbols, the player may be allowed additional spins of the selectors.

With a combination of five symbols across a payline generated in the base game, the player may get additional options. For all symbol combinations, an instant win may also be awarded to the player.

In one embodiment, if a player has been awarded the special feature of a wild card and that wild card symbol is not displayed in the base game before the player is awarded another wild card selection (such as due to three special symbols again being displayed), the player may be eligible for two games containing the wild card or may get the additional feature of the multiplier in conjunction with the wild card.

Any combination of these special features or other special features may be applied to the base game. For example, any one or any combination of the selectors 30, 32, or 34 may be incorporated into a gaming machine or be spun. There may also be more selectors for any possible feature. Additional features may include a scatter symbol that applies to any payline no matter where the scatter symbol is displayed, or a symbol that causes paylines to pay double, or a special "pattern pay" symbol, or a symbol that automatically pays a predetermined or variable amount, or a symbol that initiates any bonus game, or a symbol that makes the game a free game, or a symbol that pays awards that increase each time it is displayed (keeps the player playing longer). The scatter symbol may also be a wild card symbol that applies to any payline. In one embodiment, the scatter symbol only applies to positions in the column in which it is displayed.

The re-spin bonus for accumulated symbols, or any other feature, may be tied into the player's bet, or randomly changed, or enabled with the use of a player tracking card, or enabled only during special time periods. The bonuses, or any other active features, can stay on the machine after the player cashes out or may be extinguished when the player cashes out. The player can save the active features in a memory so that the player can use the saved features in another gaming session. This may be done using a player tracking card or any other player identification. The memory may be the casino's server connected to the gaming machines. The saved features may have an expiration date. By the player accumulating bonuses and other features, the player may effectively design her own paytable.

In the above example, the powers games feature was initiated upon the generation of special symbol combinations. In other embodiments, the power games feature can also be initiated by any triggering event. Such triggering events may be random events or predetermined times. Additionally, from time to time (either randomly or triggered by some event), the selectors 30, 32, or 34 could spin and show the player what would have been possible to win had the player triggered the power games feature. This encourages continued play.

Figure 3:
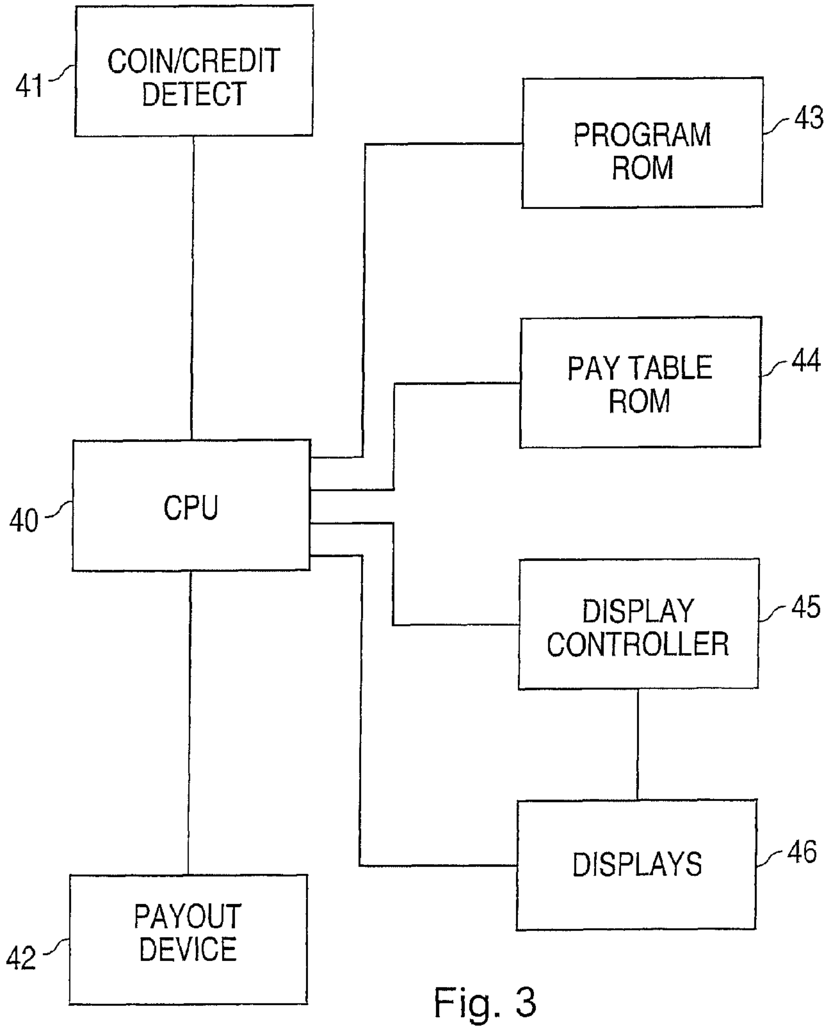
FIG. 3 is a block diagram of certain functional units in a gaming machine programmed to carry out the invention.

FIG. 3 illustrates basic circuit blocks in a suitable gaming device. A control unit (CPU 40) runs a gaming program stored in a program ROM 43. A coin/bill/credit detector 41 enables the CPU 40 to initiate a next game. A pay table ROM 44 detects the outcome of the game and identifies awards to be paid to the player. ROM 44 may also identify a special outcome to initiate the power games feature. A payout device 42 pays out an award to the player in the form of coins upon termination of the game or upon the player cashing out. The payout device 42 may instead generate a payout in the form of a coded paper ticket, credits on a smart card or magnetic strip card, or in any other form. A display controller 45 receives commands from the CPU 40 and generates signals for the various displays 46. Player commands to the CPU 40 may be input through the buttons or touch screen(s).

The gaming machine incorporating the present invention may take any form and may even be applied to on-line gaming where a player plays on a home computer connected to the Internet. Any computing device may act as the gaming machine, including mobile phones and any other device incorporating a processor and a display.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A gaming method comprising:

displaying a base game on a display screen, the base game having a plurality of possible outcomes;

triggering a selection of one or more features to be applied to the base game by a triggering event, the triggering event being detected by at least one processor;

in response to the triggering event, randomly selecting, by the at least one processor, one or more features to be applied to the base game, the one of more features providing a temporary enhancement to the base game to be applied to at least one subsequent base game, the one or more features acting to increase an award value or increase a player's chances of winning an award when playing the base game; and also in response to the triggering event, randomly selecting, by the at least one processor, a number of subsequent base games, equal to one or more, to which the one or more features will apply.

2. The method of claim 1 wherein triggering a selection comprises displaying a certain symbol combination in the base game.

3. The method of claim 2 wherein triggering a selection comprises displaying at least three matching symbols across a payline in the base game.

4. The method of claim 1 wherein randomly selecting comprises randomly selecting a wild card symbol to be applied to the base game.

5. The method of claim 1 wherein randomly selecting comprises randomly selecting an award multiplier to be applied to the base game.

6. The method of claim 1 wherein randomly selecting comprises randomly selecting a symbol that is to be a scatter symbol in the base game.

7. The method of claim 1 wherein randomly selecting comprises randomly selecting a symbol that pays an award in the base game.

8. The method of claim 1 wherein randomly selecting comprises displaying on a video screen one or more rotating wheels that display possible outcomes and displaying stopping the one or more rotating wheels to display a random selection.

9. The method of claim 1 wherein randomly selecting comprises displaying one or more motor-driven rotating wheels that display possible outcomes and stopping the one or more rotating wheels to display a random selection.

10. The method of claim 1 wherein randomly selecting one or more features comprises randomly selecting a wild card symbol, and randomly selecting an award multiplier.

11. The method of claim 1 wherein displaying the base game comprises displaying a random selection of symbols in at least one row and a plurality of columns.

12. The method of claim 1 wherein randomly selecting comprises randomly selecting a symbol whose displays in the base game are accumulated and used by the player for a function.

13. The method of claim 1 wherein randomly selecting comprises randomly selecting a symbol whose displays in the base game are accumulated and used by the player to perform additional random selections of the one or more features.

14. The method of claim 1 further comprising extinguishing the one or more features randomly selected when a player cashes out of a gaming device running the base game.

15. The method of claim 1 further comprising saving into a memory the one or more features randomly selected when a player cashes out of a gaming device running the base game so the player may use the one or more features at a later time.

16. A gaming device comprising:

a first display area for displaying a base game, the base game having a plurality of possible outcomes; and at least one processor for triggering a selection of one or more features to be applied to the base game in response to a triggering event, the one of more features providing a temporary enhancement to the base game to be applied to at least one subsequent base game, the one or more features acting to increase an award value or increase a player's chances of winning an award when playing the base game;

the at least one processor also for triggering a selection of one or more subsequent base games to which the one or more features will apply; and a second display area for displaying one or more selectors randomly selecting the one or more features to be applied to the base game in response to the triggering event, the second display area also for displaying the one or more selectors for randomly selecting a number of subsequent base games, including one or more subsequent base games, to which the one or more features will apply.

17. The device of claim 16 wherein the triggering event is a certain symbol combination in the base game.

18. The device of claim 16 wherein the second display area displays a selector for randomly selecting a wild card symbol applicable to the base game.

19. The device of claim 16 wherein the second display area displays a selector for randomly selecting an award multiplier applicable to the base game.

20. The device of claim 16 wherein the second display area displays a selector for randomly selecting a scatter symbol in the base game.

21. The device of claim 16 wherein the second display area displays a selector for randomly selecting a symbol that pays an award in the base game.

22. The device of claim 16 wherein the second display area comprises a video display.

23. The device of claim 16 wherein the second display area comprises one or more motor-driven rotating wheels that display possible outcomes and stop to display a random selection.

24. The device of claim 16 wherein the first display area and the second display area are physically separate locations.

25. The device of claim 16 wherein the second display area displays a first selector for randomly selecting a number of games to which the one or more features apply, a second selector for randomly selecting a wild card symbol, and a third selector for randomly selecting an award multiplier.

26. The device of claim 16 wherein the first display area displays a random selection of symbols in at least one row and a plurality of columns.

27. The device of claim 16 wherein the second display area displays a selector that randomly selects a symbol whose displays in the base game are accumulated and used by the player for a function.

28. The device of claim 16 wherein the second display area displays a selector that randomly selects a symbol whose displays in the base game are accumulated and used by the player to perform additional random selections of the one or more features.

29. The device of claim 16 wherein the gaming device is connected to the Internet for on-line gaming.

30. The method of claim 1 wherein the gaming method is performed as an on-line gaming method via the Internet.

* * * * *

UNITED STATES PATENT AND TRADEMARK OFFICE

CERTIFICATE OF CORRECTION

PATENT NO. : 8,579,689 B2
APPLICATION NO. : 10/655950
DATED : November 12, 2013
INVENTOR(S) : Michael Gauselmann It is certified that error appears in the above-identified patent and that said Letters Patent is hereby corrected as shown below:

In the Claims

Column 5
Line 28, Claim 1, where "one of more" should read --one or more--.

Column 6
Line 24, Claim 16, where "one of more" should read --one or more--.

Signed and Sealed this
Eleventh Day of February, 2014

Michelle K. Lee
*Deputy Director of the United States Patent and Trademark Office*